United States Patent
Jin et al.

(10) Patent No.: US 10,771,106 B1
(45) Date of Patent: Sep. 8, 2020

(54) PROACTIVE ECHO CANCELLATION (EC) TRAINING

(71) Applicant: Cisco Technology, Inc., San Jose, CA (US)

(72) Inventors: Hang Jin, Plano, TX (US); Tong Liu, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/362,293

(22) Filed: Mar. 22, 2019

(51) Int. Cl.
*H04L 12/64* (2006.01)
*H04B 3/23* (2006.01)
*H04L 12/28* (2006.01)

(52) U.S. Cl.
CPC ......... *H04B 3/238* (2013.01); *H04L 12/2898* (2013.01); *H04L 12/6418* (2013.01); *H04L 2012/6421* (2013.01); *H04L 2012/6491* (2013.01)

(58) Field of Classification Search
CPC . H04B 3/238; H04L 12/6418; H04L 12/2898; H04L 2012/6421; H04L 2012/6491
See application file for complete search history.

(56) References Cited

U.S. PATENT DOCUMENTS

| | | | | |
|---|---|---|---|---|
| 7,133,442 | B2 * | 11/2006 | Hamdi | H04B 1/1027 375/222 |
| 10,505,571 | B1 * | 12/2019 | Yagil | H04B 1/0475 |
| 2012/0014420 | A1 * | 1/2012 | Wu | H04L 25/03343 375/219 |
| 2018/0343031 | A1 * | 11/2018 | Yagil | H04L 5/143 |
| 2018/0343033 | A1 * | 11/2018 | Sun | H04B 3/487 |
| 2019/0028145 | A1 * | 1/2019 | Sun | H04B 3/231 |
| 2019/0044626 | A1 * | 2/2019 | Hewavithana | H04B 17/17 |
| 2019/0268037 | A1 * | 8/2019 | Ramesh | H04B 3/23 |
| 2019/0356353 | A1 * | 11/2019 | Nuzman | H04B 1/40 |

* cited by examiner

*Primary Examiner* — Kenneth T Lam
(74) *Attorney, Agent, or Firm* — Merchant & Gould P.C.

(57) ABSTRACT

Proactive Echo Cancellation (EC) training may be provided. First, a plurality of Echo Cancelation Training Opportunities (ECTOs) may be identified in an upstream bandwidth allocation. Identifying the ECTOs may comprise identifying a corresponding plurality of mini-slots in a two dimensional time frequency space designated as not to be used for Upstream (US) traffic. Then Echo Cancelation Training (ECT) may be conducted for each of the plurality of ECTOs.

21 Claims, 5 Drawing Sheets

PROACTIVE ECHO CANCELLATION (EC) TRAINING

TECHNICAL FIELD

The present disclosure relates generally to echo cancellation.

BACKGROUND

A Hybrid Fiber-Coaxial (HFC) network is a broadband network that combines optical fiber and coaxial cable. It has been commonly employed globally by cable television operators. In a HFC cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Proactive Echo Cancellation (EC) training may be provided. First, a plurality of Echo Cancelation Training Opportunities (ECTOs) may be identified in an upstream bandwidth allocation. Identifying the ECTOs may comprise identifying a corresponding plurality of mini-slots in a two dimensional time frequency space designated as not to be used for Upstream (US) traffic. Then Echo Cancelation Training (ECT) may be conducted for each of the plurality of ECTOs.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system operators (MSOs) are operators of multiple cable or direct-broadcast satellite television systems. These systems may include HFC networks. To amplify upstream (US) signals and downstream (DS) signals in the HFC network, MSOs may use nodes deployed within the HFC. In the HFC network, a node may comprise a container that may house optical and electrical circuitry. An optical fiber cable or a coaxial cable may be connected to an input side of the node and a plurality of coaxial cables may be connected to a output side of the node. The input side of the node may be connect to a headend in the HFC network and the DS side of the node may be connected to Customer Premises Equipment (CPE) of subscribers to the HFC. Amplifiers may be used in the node to amplify upstream (US) signals and downstream (DS) signals. Embodiments of the disclosure may provide an echo cancellation (EC) process that may support full duplex (FDX) Data Over Cable Service Interface Specification (DOCSIS) operation.

Figure 1:
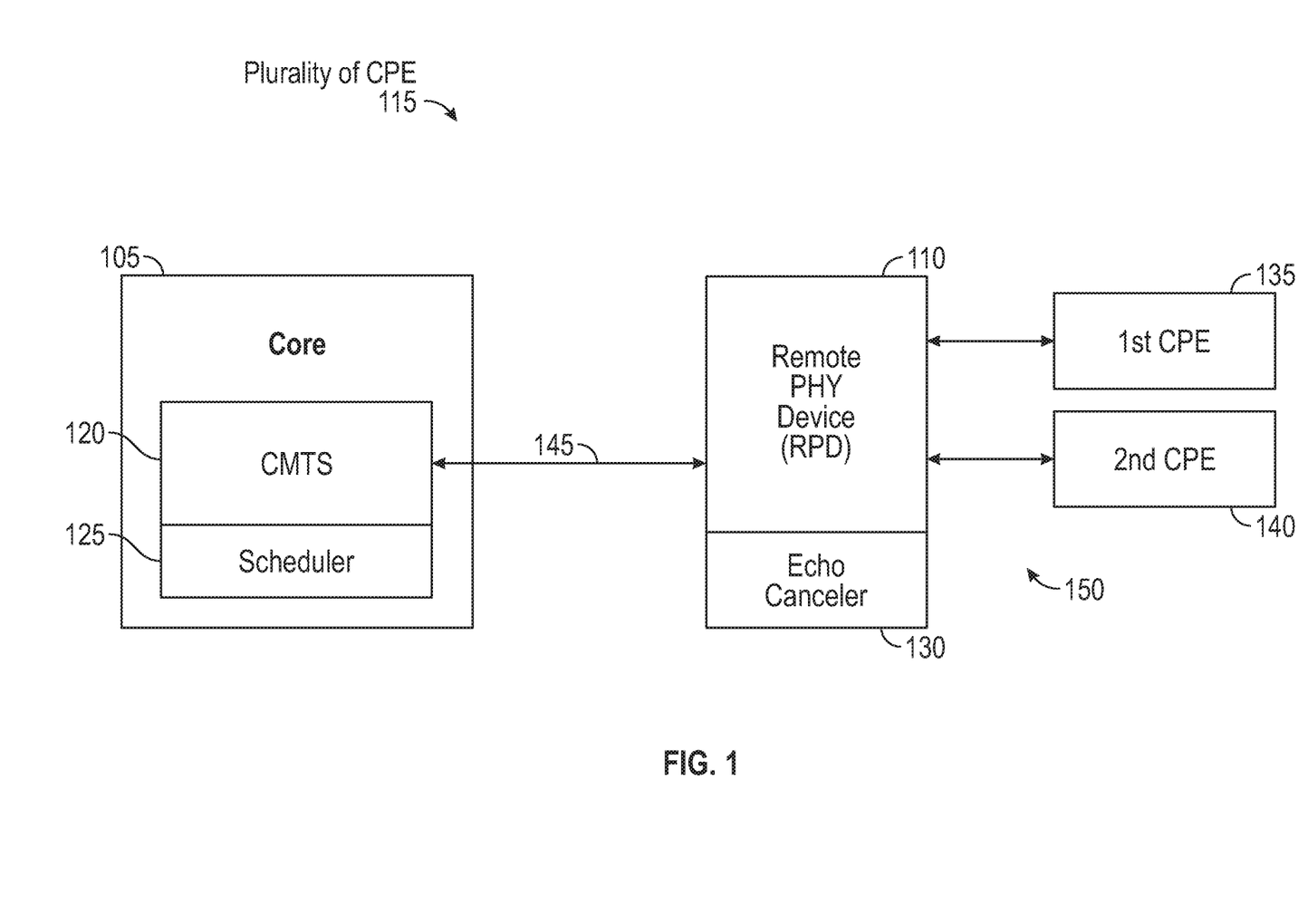
FIG. 1 is a block diagram of a system for providing proactive Echo Cancellation (EC) training.

FIG. 1 is a block diagram of a system 100 for providing proactive Echo Cancellation (EC) training consistent with embodiments of the disclosure. System 100 may comprise a Distributed Access Architecture (DAA). As shown in FIG. 1, system 100 may comprise a core 105, a remote PHY device (RPD) 110, and a plurality of Customer Premises Equipment (CPE) 115. Core 105 may comprise a Converged Cable Access Platform (CCAP) core and may include a Cable Modem Termination System (CMTS) 120 that may include a scheduler 125. RPD 110 may comprise an echo canceler 130. Plurality of CPE 115 may comprise a first CPE 135 and a second CPE 140.

CMTS 120 may comprise a device located in a service provider's (e.g., a cable company's) headend (i.e., core 105) that may be used to provide high speed data services, such as cable Internet or Voice-Over-Internet Protocol, to subscribers. Remote physical layer (i.e., RPHY) may comprise shifting or distributing the physical layer (i.e., PHY) of a conventional cable headend CMTS to fiber nodes (e.g., RPD nodes) in a network. RPD 110 may comprise circuitry to implement the physical layer of the CMTS. First CPE 135 and second CPE 140 may comprise, but are not limited to, a Cable Modem (CM), a cellular base station, a tablet device, a mobile device, a smart phone, a telephone, a remote control device, a set-top box, a digital video recorder, a personal computer, a network computer, a mainframe, a router, or other similar microcomputer-based device.

RPD 110 may comprise a node in an HFC network. RPD 110 may comprise a container that may house optical and electrical circuitry. An optical fiber cable 145 may be connected to one side of RPD 110 and a plurality of coaxial cables 150 may be connected to the other side of RPD 110. Optical fiber cable 145 may be connected to CMTS 120 in core 105 in the HFC network. Plurality of coaxial cables 150 may be connected to plurality of CPE 115 of subscribers to the HFC. As such, RPD 110 may facilitate communications between core 105 and plurality of CPE 115.

Elements described above of system 100 (e.g., RPD 110, CMTS 120, scheduler 125, echo canceler 130, first CPE 135, and second CPE 140) may be practiced in hardware and/or in software (including firmware, resident software, microcode, etc.) or in any other circuits or systems. Elements of system 100 may be practiced in electrical circuits comprising discrete electronic elements, packaged or integrated electronic chips containing logic gates, a circuit utilizing a microprocessor, or on a single chip containing electronic elements or microprocessors. Elements of system 100 may also be practiced using other technologies capable of performing logical operations such as, for example, AND, OR, and NOT, including but not limited to, mechanical, optical, fluidic, and quantum technologies. As described in greater detail below with respect to FIG. 5, elements of system 100 may be practiced in a computing device 500.

Consistent with embodiments of the disclosure, system 100 may support FDX DOCSIS operation. Echoes may occur in FDX DOCSIS operations. Echo Cancellation (EC) (e.g., via echo canceler 130) may be implemented for suppressing self-interference (e.g., from a transmitter in RPD 110 to a receiver in RPD 110) to enable FDX operations. CMTS 120 may ensure proper Echo Cancellation Training (ECT) for echo canceller 130 to observe and characterize the echoes, in order to derive EC coefficients.

ECT may be done during a "quiet period" during which there may be no Upstream (US) transmissions, so the received US signal may contain the echoes of the transmitted Downstream (DS) signal and the channel noise. Such a quiet period may be referred to as an ECT opportunity. Per the FDX DOCSIS 3.1 specification, an ECT opportunity may cover an entire 96 MHz upstream channel and may last one or multiple Orthogonal Frequency Division Multiple Access (OFDMA) frames. Because the magnitude and phase of the echoes may change over time (i.e., time varying channel), periodic ECT may be used to maintain sufficient convergence of the EC. However, because no US transmission may be permitted in an ECT opportunity, frequent ECT incurs high bandwidth cost.

The FDX DOCSIS 3.1 specification defines reactive ECT scheduling, where a CMTS schedules ECTs at a size and interval based on the ECT requests from an echo canceller. In the DAA, the CMTS US scheduler is located at the CCAP core, separated from the echo canceller at the RPD over a Converged Interconnect Network (CIN). Round Trip Time (RTT) over the CIN, may be in the order of multiple milliseconds, causing delayed ECT training opportunities that may result in echo cancelation divergence. This may be problematic in cases where the channel experiences rapid changes (e.g., wind blowing, heavy truck parking close to cable pedestal, etc.). Consequently, there may be a need for frequent and always-on ECT opportunities at a low bandwidth cost.

Embodiments of the disclosure may provide a proactive Echo Cancellation Training (ECT) process that may provide always-on ECTs and at low bandwidth cost. CMTS 120 may proactively schedule Echo Cancelation Training Opportunities (ECTOs) without waiting for ECT requests from echo canceller 130. ECTOs may be formed explicitly with dedicated mini-slots, or implicitly when a grant is not used or is partially used. For explicit ECTOs, CMTS 120 may restrict an ECTO to one or a few mini-slots at low bandwidth cost. For example, a one-mini-slot ECT may take 0.42% of the spectrum of a 96 MHz FDX US channel.

CMTS 120 may achieve channel level ECT, for example, by allocating mini-slot level ECTOs in nearly every frame with different mini-slot offsets relative to the start of the channel spectrum. Echo canceller 130 at RPD 110 may detect ECTOs in time and frequency for constant EC training.

Figure 2:
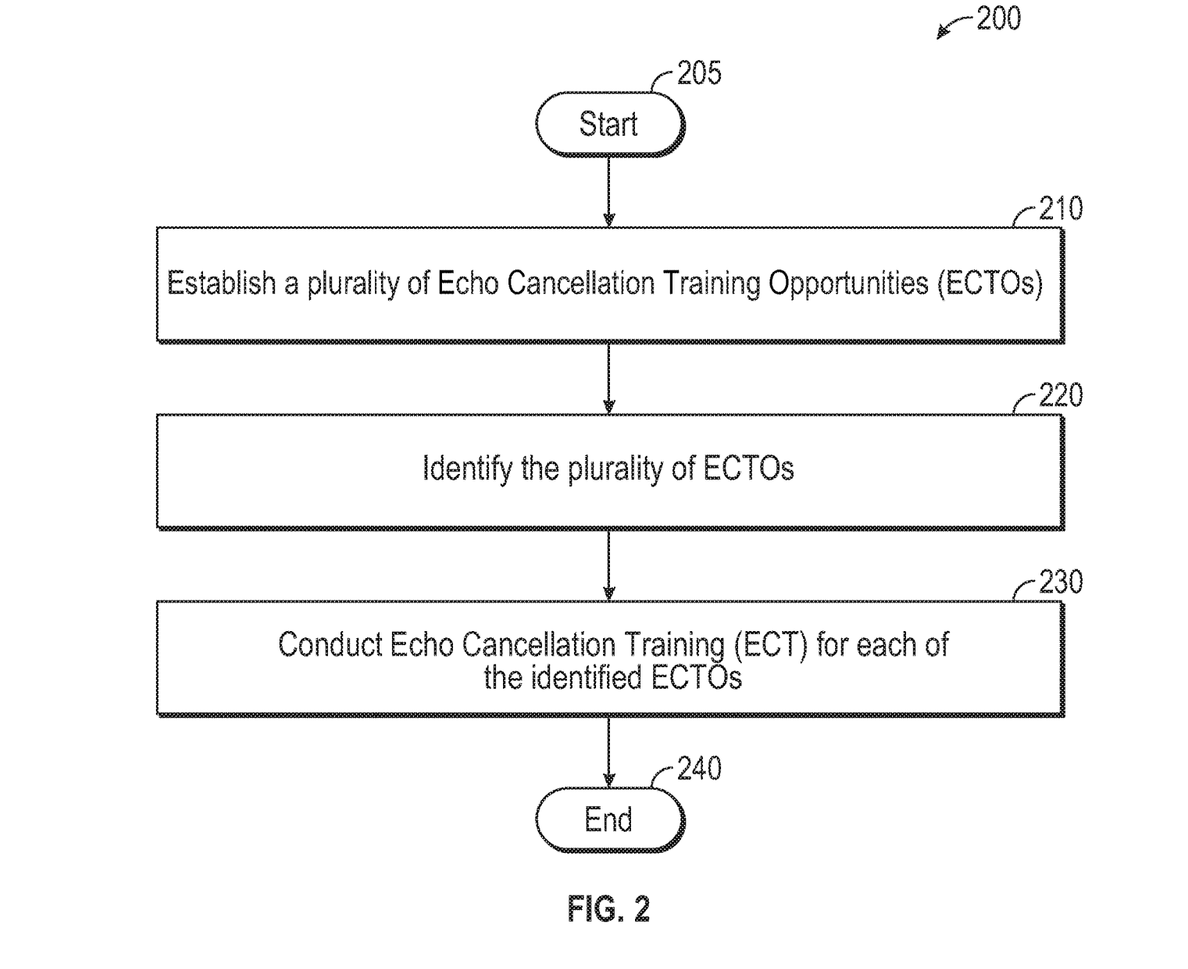
FIG. 2 is a flow chart of a method for providing proactive EC training.

FIG. 2 is a flow chart setting forth the general stages involved in a method 200 consistent with an embodiment of the disclosure for providing proactive Echo Cancellation (EC) training. Method 200 may be implemented using echo canceler 130 as described in more detail above with respect to FIG. 1. Ways to implement the stages of method 200 will be described in greater detail below.

Method 200 may begin at starting block 205 and proceed to stage 210 where a plurality of Echo Cancelation Training Opportunities (ECTOs) may be established. For example, ECTOs may comprise Explicit Echo Cancelation Training Opportunity (EECTOs) and Implicit Echo Cancelation Training Opportunity (IECTOs).

Figure 3:
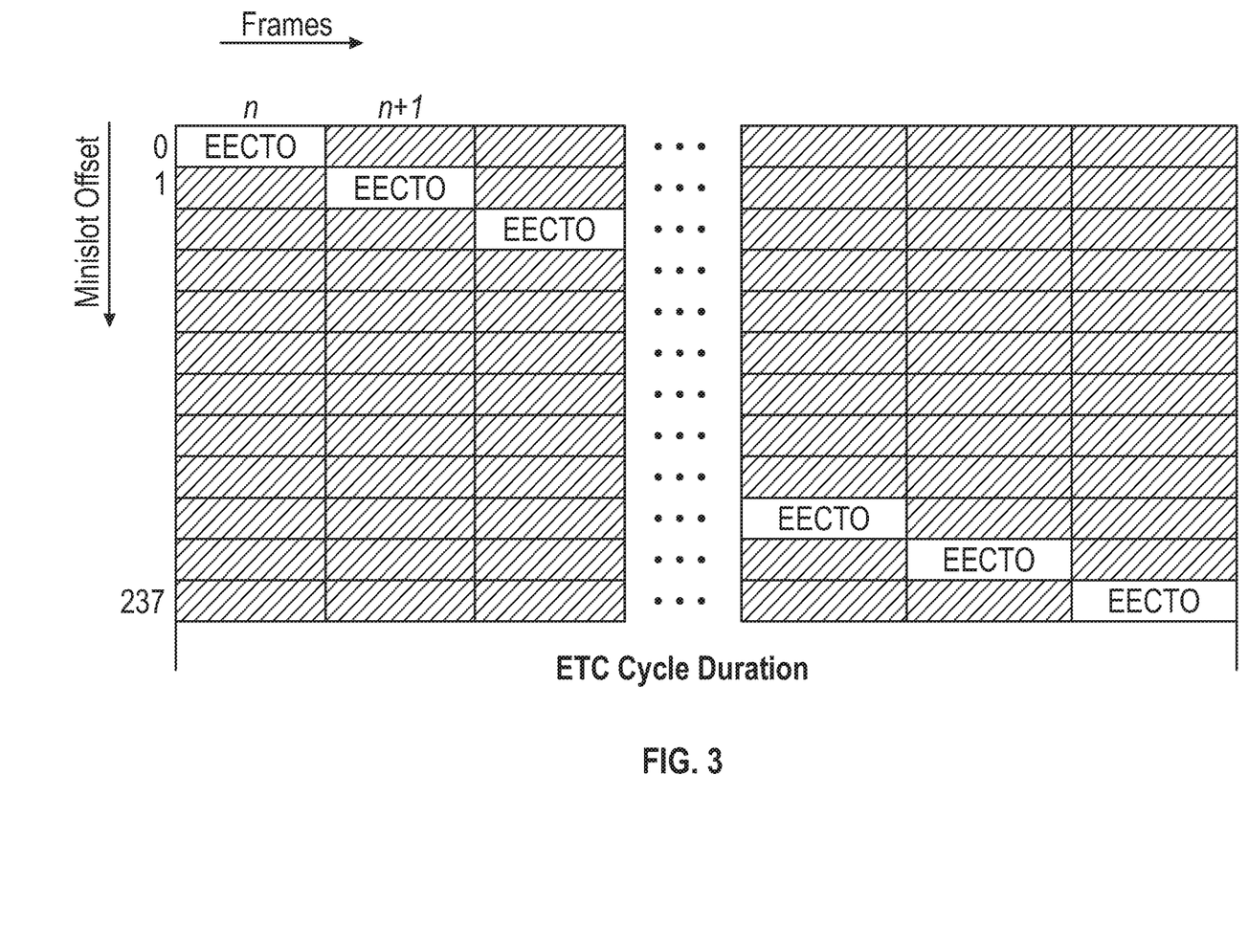
FIG. 3 illustrates Explicit Echo Cancellation Training Opportunity (EECTO) scheduling.

FIG. 3 illustrates EECTO scheduling. As shown in FIG. 3, an EECTOs may comprise one or more mini-slots reserved for EC training. Mini-slots included in an EECTO may be assigned, for example, to NULL Service Flow Identifier (SID) or a designated SID not used for any US transmissions.

CMTS 120 may limit the spectrum overhead by controlling the number of mini-slots included in an EECTO. For example, a 1 mini-slot per frame EECTO may be equivalent to 1/237 (i.e., 0.42%) of an 96 MHz FDX US channel bandwidth (a channel may have 237 mini-slots). EECTOs may be placed at different mini-slots, for example, over consecutive frames. The time to cover a channel may be referred to as an ECT cycle duration.

Under fast interference changing conditions, the ECT cycle duration may be reduced with slight increase of the spectrum cost. For example, at a 400 μs frame size, the ECT cycle duration may comprise 94.8 ms (i.e., 400 μs×237) with 1 mini-slot for EECTO per frame (i.e., spectrum overhead=0.42%). However, an ECT cycle duration may comprise 9.48 ms with 10 mini-slots for EECTO per frame (i.e., spectrum overhead=4.2%).

Figure 4:
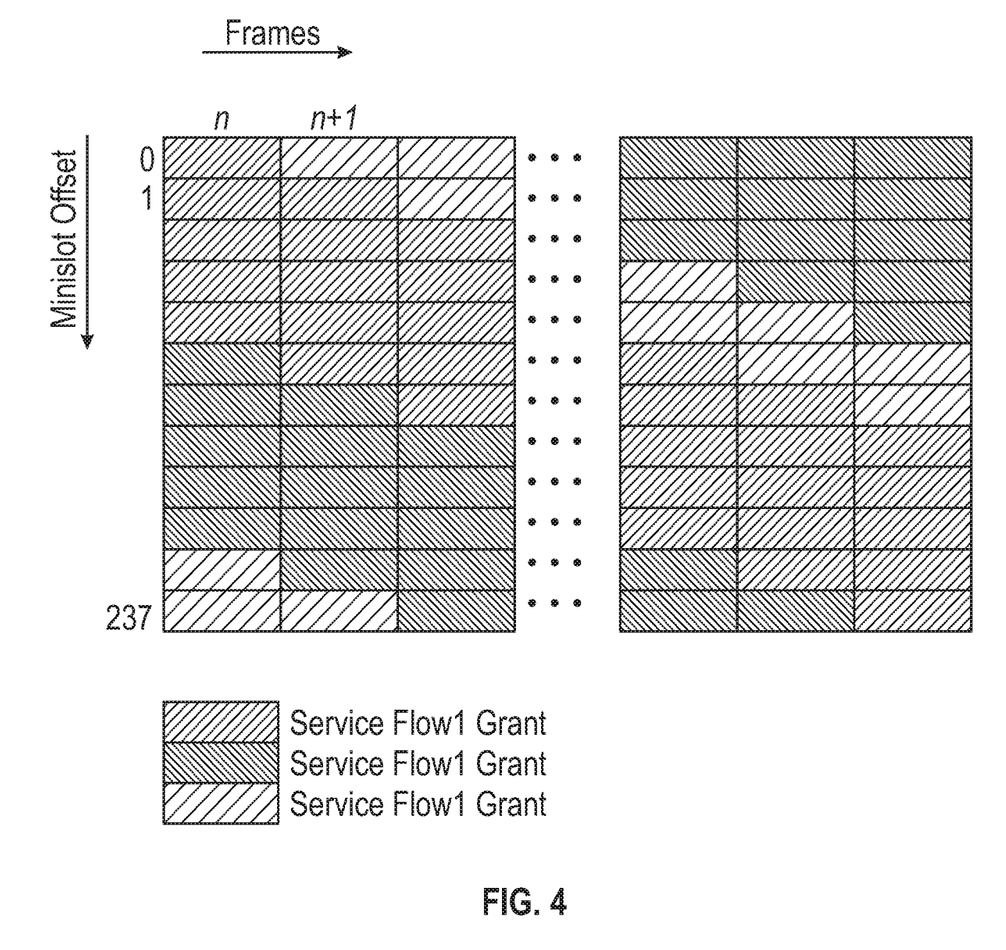
FIG. 4 illustrates Implicit Echo Cancellation Training Opportunity (IECTO) scheduling.

FIG. 4 illustrates IECTO scheduling. As shown in FIG. 4, an IECTO may comprise an "accidental" ECTO, created whenever there may be a gap between grants or when a grant is not fully used. This may include: i) contention regions in an upstream bandwidth allocation map provided to RPD 110 from scheduler 125; ii) guard time for routine DOCSIS operations such as Upstream Channel Descriptor (UCD) change, sounding, and Proactive Network Maintenance (PNM) functions; and iii) unused or partially used data grants when the grant size is bigger than a packet queue size at the CPE. FDX DOCSIS may require a per CPE (e.g., Cable Modem (CM)) grant size to be greater than a minimum grant bandwidth to meet fidelity requirements. Predictive granting for low-latency service may result in frequently unused grants.

Consistent with embodiments of the disclosure, IECTOs may complement EECTOs and my provide additional EC training at no extra spectrum overhead cost. Furthermore, CMTS 120 may shift the grant locations, such that the subsequent grants end at different mini-slot offsets in order to cover an entire channel frequency spectrum over time. The potentially unused mini-slots may comprise the remaining mini-slots at the end of a grant after a queue is served.

From stage 210, where the plurality of ECTOs are established, method 200 may advance to stage 220 where echo canceler 130 may identify the plurality of ECTOs. For example, the ECTOs may be referred to as "silent windows" or "quiet periods". There may be several ways that RPD 110 (e.g., echo canceler 130 in RPD 110) may detect silent windows. One way to detect silent windows may be via a special SID. For example, scheduler 125 at CMTS 120 may assign a special SID to mini-slots that may be designated as a silent windows for ECT in the upstream bandwidth allocation map that scheduler 125 may provide to RPD 110.

RPD 110 may parse the upstream bandwidth allocation map to determine where the silent windows are ahead of time. This can be used to identify EECTOs as described above with respect to FIG. 3.

Another way to detect silent windows may be via power detection. For example, RPD 110 may detect the power of mini-slots at each frame, and based on the detected power, it may determine that there are US signals at the mini-slot. This may be used to identify either EECTOs or IECTOs.

Silent window detection via power detection may be described as follows. Echo Cancelation (EC) coefficients, for example, may be determined in the frequency domain for each and every subcarrier (i.e., frequency domain EC). Echoes may be characterized by echo canceler 130 with echo cancelation turned on. For example, echo cancelation may be on once US traffic on the FDX band is turned on. Thus, the EC coefficients may be determined as changes (i.e., deltas) except, for example, in the initial stage where the EC coefficients may be set to zero.

For each subcarrier, embodiments of the disclosure may determine the symbol power as follows:

$p=sum(abs(si)^2)$, where $si$ is the symbol level on the subcarrier $i$, where $i=1, 2, \ldots N$, where $N$ is the frame length.

If $p>p0i$, this subcarrier may be skipped, if $<p0i$, this may be an empty subcarrier, so its EC coefficients may be determined and updated. Consistent with embodiments of the disclosure, $p0i$ may comprise a pre-determined threshold, for example, for subcarrier i.

With echo cancelation turned on at echo canceler 130, the Signal-to-Noise (SNR) of the US signal may, for example, be >25 dB, and may, for example, at least be >10 dB. Accordingly, there may be a minimum 10 dB power jump after EC is turned on when there is an US signal. Embodiments of the disclosure may set $p0i$ as the middle value of the average US signal power observed after EC on subc i:

$P0i=N/2*P\_ave\_i$; where $P\_ave\_i$ is the average US power observed after EC on subc $i$. $N$ is the frame length.

To improve the robustness of silent window detection, the detection may be done on a per mini-slot base. For each mini-slot, embodiments of the disclosure may determine symbol power as follows:

$p1=sum(abs(sij)^2)$, sij is the symbol level on subcarrier i and on symbol j;

$i=1, 2, \ldots N$, N is the frame length, $j=1, 2, \ldots, M$, M is the mini-slot width If $p1>p10$, skip all the subcarrier in this mini-slot, if $p1<p10$, this is an empty mini-slot, the EC coefficient may be computed and updated on every subcarrier within this MS. Embodiments of the disclosure may set $p10=N/2*P\_ave\_ms\_i'$, where $P\_ave\_ms\_i'$ is the average US power observed after EC on mini-slot i'.

Accordingly, silent window detection may involve power detection with minimum overhead.

Compared to the special SID approach, the power detection approach may have many benefits. For example, contention regions may be utilized for ECT. Contention regions may be planned for collision avoidance and low latency, thus the capacity may largely be under-utilized, and most of time the contention regions may have no signals. The power detection approach may detect if there are contention signals, and if not, it may be utilized for ECT. As another example, un-used mini-slots may be utilized for ECT. Some mini-slots may be assigned to an SID (CM), but they may not be used for various reasons (e.g., dropped MAP, scheduler does not schedule them, CM may have no US data, etc.). Those un-used mini-slots may be detected via power detection and used for ECT. As yet another example, power detection approach may be used for both FDX RDP and FDX amplifier. FDX amplifier may not have the capability to parse an upstream bandwidth allocation map. The power detection approach may be feasible for FDX amplifiers.

Once echo canceler 130 identifies the plurality of ECTOs in stage 220, method 200 may continue to stage 230 where echo canceler 130 may conduct Echo Cancelation Training (ECT) for each of the identified ECTOs. For example, EC coefficients may be determined for each subcarrier in a mini-slot within a silent window as coefficient changes (i.e., deltas). Once they are determined, the EC coefficients changes may be used to update EC coefficients used by echo canceller 130 through a rolling or a synchronizing process. With the rolling process, for each mini-slot, once its EC coefficient changes are obtained, embodiments of the disclosure may use them to update the current EC coefficients, and apply the new EC coefficients by echo canceller 130 in the next frame. However, with the synchronizing process, embodiments of the disclosure may wait until the EC coefficients of all the mini-slots have been updated, and apply the new EC coefficients of all the subcarrier at once by echo canceller 130. The synchronizing approach may reduce data interruptions. After echo canceler 130 conducts ECT for each of the identified ECTOs in stage 230, method 200 may then end at stage 240.

For FDX systems, embodiments of the disclosure may provide echo cancellation performed in the frequency domain on each subcarrier on each active mini-slot. Embodiments of the disclosure may comprise an echo cancellation training scheme that uses, in an FDX system, EECTOs that may comprise a pattern of mini-slots in two dimension time-frequency space in which the pattern of mini-slots may have equal or close to equal coverage of each active mini-slots and where the pattern of mini-slots may be dynamically adjusted based on channel conditions and per request.

In addition, embodiments of the disclosure may comprise an echo cancellation training scheme that uses, in an FDX system, IECTOs that may comprise mini-slots that may be assigned for US traffic, but may not be used by CPEs for US traffic. The IECTOs may include contention regions, un-used mini-slots, and un-assigned mini-slots. Scheduler 125 may schedule US allocation in such a way that these IECTOs may have equal or close to equal coverage of each active mini-slots.

Embodiments of the disclosure my provide, for an FDX system, echo canceller 130 that may parse an upstream bandwidth allocation map provided by scheduler 125, identify EECTOs, and conduct ECT on the identified EECTOs. In addition, embodiments of the disclosure my provide, for an FDX system, echo canceller 130 that may detect the US power of the each subcarrier, tag the subcarrier as an IECTO when the detected power is less than a pre-determined threshold, and conduct ECT on the identified ECT opportunities. Moreover, embodiments of the disclosure my provide, for an FDX system, echo canceller 130 that may detect the US power of each mini-slot, tag the mini-slot as an IECTO when the detected power is less than the pre-determined threshold, and conduct ECT on the identified ECT opportunities.

Figure 5:
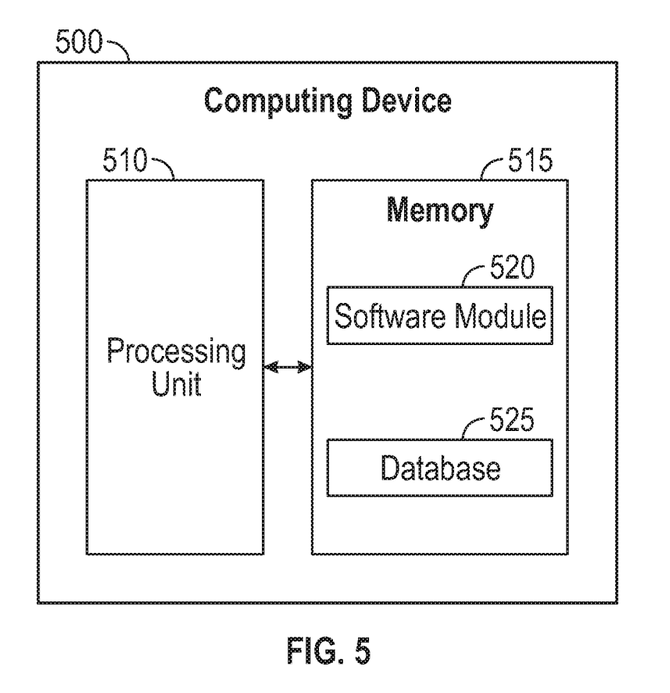
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing proactive Echo Cancellation (EC) training, including for example, any one or more of the stages from method 200 described above with respect to FIG. 2. Computing device 500, for example, may provide an operating environment for RPD 110, CMTS 120, scheduler 125, echo canceler 130, first CPE 135, and second CPE 140. RPD 110, CMTS 120, scheduler 125, echo canceler 130, first CPE 135, and second CPE 140 may operate in other environments and is not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   identifying a plurality of Echo Cancelation Training Opportunities (ECTOs) in an upstream bandwidth allocation map, wherein identifying the ECTOs comprises identifying a corresponding plurality of mini-slots in a two dimensional time frequency space designated as not to be used for Upstream (US) traffic; and
   conducting Echo Cancelation Training (ECT) for each of the plurality of ECTOs, wherein conducting ECT for each of the plurality of ECTOs comprises:

determining iteratively, on a frame-by-frame basis, Echo Cancelation (EC) coefficients for each subcarrier in each mini-slot of the plurality of mini-slots, the each mini-slot comprising a fraction of an upstream bandwidth, and updating an echo canceller with the determined EC coefficients each time a frame has been completed.

2. The method of claim 1, wherein each of the plurality of mini-slots have a different offset relative to a start of a channel spectrum.

3. The method of claim 1, wherein the plurality of mini-slots are spread over a plurality of frames.

4. The method of claim 1, wherein identifying the plurality of mini-slots comprises identifying a Service Flow Identifier (SID) for each of the plurality of mini-slots corresponding to a NULL SID.

5. The method of claim 1, wherein identifying the plurality of mini-slots comprises identifying a Service Flow Identifier (SID) for each of the plurality of mini-slots comprising a SID corresponding to a service flow not used for US traffic.

6. The method of claim 1, further comprising:
updating the echo canceller with the determined EC coefficients after determining the EC coefficients for the each subcarrier in the plurality of mini-slots.

7. The method of claim 1, further comprising receiving the upstream bandwidth allocation map from a Cable Modem Termination System (CMTS) that scheduled the plurality of ECTOs in the upstream bandwidth allocation map.

8. The method of claim 1, wherein the ECTOs comprise explicit ECTOs.

9. The method of claim 1 wherein the ECTOs comprise implicit ECTOs.

10. A system comprising:
a memory storage; and
a processing unit coupled to the memory storage, wherein the processing unit is operative to:
identify a plurality of Echo Cancelation Training Opportunities (ECTOs) in an upstream bandwidth allocation map, wherein the processing unit being operative to identify the ECTOs comprises the processing unit being operative to identify a corresponding plurality of mini-slots in a two dimensional time frequency space designated as not to be used for Upstream (US) traffic; and
conduct Echo Cancelation Training (ECT) for each of the plurality of ECTOs, wherein the processing unit being operative to conduct ECT for each of the plurality of ECTOs comprises the processing unit being operative to:
determine iteratively, on a frame-by-frame basis, Echo Cancelation (EC) coefficients for each subcarrier in each mini-slot of the plurality of mini-slots, the each mini-slot comprising a fraction of an upstream bandwidth, and
update an echo canceller with the determining EC coefficients each time a frame has been completed.

11. The system of claim 10, wherein the plurality of mini-slots each have a different offset relative to a start of a channel spectrum.

12. The system of claim 10, wherein the plurality of mini-slots are spread over a plurality of frames.

13. The system of claim 10, wherein the processing unit being operative to identify the plurality of mini-slots comprises the processing unit being operative to identify a Service Flow Identifier (SID) for each of the plurality of mini-slots corresponding to a NULL SID.

14. The system of claim 10, wherein the processing unit being operative to identify the plurality of mini-slots comprises the processing unit being operative to identify a Service Flow Identifier (SID) for each of the plurality of mini-slots comprising a SID corresponding to a service flow not used for US traffic.

15. The system of claim 10, wherein the processing unit is further operative to receive the upstream bandwidth allocation map from a Cable Modem Termination System (CMTS) that scheduled the plurality of ECTOs in the upstream bandwidth allocation map.

16. The apparatus of claim 10, wherein the ECTOs comprise explicit ECTOs.

17. A non-transitory computer readable medium storing instructions which when executed perform a method comprising:
identifying a plurality of Echo Cancelation Training Opportunities (ECTOs) in an upstream bandwidth allocation map, wherein identifying the ECTOs comprises identifying a corresponding plurality of mini-slots in a two dimensional time frequency space designated as not to be used for Upstream (US) traffic; and
conducting Echo Cancelation Training (ECT) for each of the plurality of ECTOs, wherein conducting ECT for each of the plurality of ECTOs comprises:
determining iteratively, on a frame-by-frame basis, Echo Cancelation (EC) coefficients for each subcarrier in each mini-slot of the plurality of mini-slot, the each mini-slot comprising a fraction of an upstream bandwidth, and
updating an echo canceller with the determined EC coefficients each time a frame has been completed.

18. The non-transitory computer readable medium of claim 17, wherein the plurality of mini-slots each have a different offset relative to a start of a channel spectrum.

19. The non-transitory computer readable medium of claim 17, wherein the plurality of mini-slots are spread over a plurality of frames.

20. The non-transitory computer readable medium of claim 17, wherein identifying the plurality of mini-slots comprises identifying a Service Flow Identifier (SID) for each of the plurality of mini-slots corresponding to a NULL SID.

21. The non-transitory computer readable medium of claim 17, wherein identifying the plurality of mini-slots comprises identifying a Service Flow Identifier (SID) for each of the plurality of mini-slots comprising a SID corresponding to a service flow not used for US traffic.

* * * * *